(12) United States Patent
Shmyreva et al.

(10) Patent No.: US 10,077,717 B2
(45) Date of Patent: Sep. 18, 2018

(54) CORROSION AND ABRASION RESISTANT COATING

(71) Applicant: Rolls-Royce Corporation, Indianapolis, IN (US)

(72) Inventors: Tetyana P. Shmyreva, Indianapolis, IN (US); Brad F. Wiley, Indianapolis, IN (US); Gabrielle M. Casey, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 160 days.

(21) Appl. No.: 14/861,189

(22) Filed: Sep. 22, 2015

(65) Prior Publication Data

US 2016/0097329 A1  Apr. 7, 2016

Related U.S. Application Data

(60) Provisional application No. 62/058,274, filed on Oct. 1, 2014.

(51) Int. Cl.

| F02C 7/36 | (2006.01) |
|---|---|
| F16H 57/02 | (2012.01) |
| C25D 11/02 | (2006.01) |
| C25D 11/24 | (2006.01) |
| C23C 28/00 | (2006.01) |
| F01D 25/24 | (2006.01) |
| C23C 24/04 | (2006.01) |

(52) U.S. Cl.
CPC .............. *F02C 7/36* (2013.01); *C23C 24/04* (2013.01); *C23C 28/345* (2013.01); *C25D 11/026* (2013.01); *C25D 11/246* (2013.01); *F01D 25/24* (2013.01); *F16H 57/02* (2013.01); *B05D 2202/20* (2013.01); *B05D 2350/63* (2013.01); *F05D 2220/32* (2013.01); *F05D 2230/90* (2013.01); *F05D 2300/121* (2013.01); *F05D 2300/125* (2013.01); *F05D 2300/514* (2013.01); *F05D 2300/607* (2013.01); *F05D 2300/611* (2013.01); *Y02T 50/671* (2013.01)

(58) Field of Classification Search
CPC ......... F02C 7/36; C23C 24/04; C23C 28/345; C25D 11/026; C25D 11/246; F01D 25/24; F16H 57/02; B05D 2202/20; B05D 2350/63; F05D 2220/32; F05D 2230/90; F05D 2300/121; F05D 2300/125; F05D 2300/514; F05D 2300/607; F05D 2300/611; Y02T 50/671

See application file for complete search history.

(56) References Cited

U.S. PATENT DOCUMENTS

| 3,293,158 | A | 12/1966 | McNeill et al. |
|---|---|---|---|
| 3,394,066 | A | 7/1968 | Miles |
| 3,957,608 | A | 5/1976 | Streel |
| 4,184,926 | A | 1/1980 | Kozak |
| 4,592,958 | A | 6/1986 | Mosser et al. |
| 4,980,203 | A | 12/1990 | Dabosi et al. |
| 5,961,807 | A | 10/1999 | Daum et al. |
| 5,980,723 | A * | 11/1999 | Runge-Marchese et al. ............... C09D 5/24 205/316 |
| 6,365,028 | B1 | 4/2002 | Shatrov |
| 6,808,613 | B2 | 10/2004 | Beauvir |
| 7,732,056 | B2 | 6/2010 | Bhatnagar et al. |
| 8,337,689 | B2 | 12/2012 | Yun et al. |
| 2006/0101992 | A1 | 5/2006 | Hiratsuka |
| 2006/0207884 | A1 | 9/2006 | Shpakovsky et al. |
| 2008/0093223 | A1 | 4/2008 | Yoshioka et al. |
| 2010/0155251 | A1* | 6/2010 | Bogue et al. ........... C23C 24/04 205/81 |
| 2014/0017488 | A1 | 1/2014 | Haack et al. |

FOREIGN PATENT DOCUMENTS

JP  2006300294 A  11/2006

OTHER PUBLICATIONS

Nykyforchyn, H.M., et al., "Electromechanical Characteristics of PEO Treated Electric Arc Coatings on Lightweight Alloys," Advanced Materials Research, Oct. 19, 2010, vol. 138, pp. 55-61, Switzerland.
Barik, R., et al., "Corrosion, erosion and erosion-corrosion performance of plasma electrolytic oxidation (PEO) deposited A1203 coatings," Surface and Coatings Technology, Elsevier, Sep. 22, 2005, vol. 199, No. 2-3, pp. 158-167, Amsterdam, NL.
Rong-Gang, Hu, et al., "Recent progress in corrosion protection of magnesium alloys by organic coatings," Progress in Organic Coatings, Elsevier BV, NL, Oct. 14, 2011, vol. 73, No. 2, pp. 129-141.
European Search Report for Application No. 15187148, search date Jan. 22, 2016, 3 pages.
Champagne et al., "Magnesium Repair by Cold Spray," Army Research Laboratory, ARL-TR-4438, May 2008, 34 pp.

(Continued)

*Primary Examiner* — Nathan M Nutter

(74) *Attorney, Agent, or Firm* — Shumaker & Sieffert, P.A.

(57) ABSTRACT

A gearbox adapted for use with a gas turbine engine and a method for making the same are disclosed herein. The gearbox comprising a housing made from a magnesium alloy, and an aluminum oxide coating on the magnesium alloy housing. The aluminum oxide coating may inhibit corrosion of the housing, and may have a nano-microcrystalline structure that defines an inner region bonded directly to the housing and an outer region spaced apart from the housing.

19 Claims, 2 Drawing Sheets

(56) References Cited

OTHER PUBLICATIONS

Response to Extended Search Report dated Feb. 3, 2016, from counterpart European Application No. 15187148.0, filed Sep. 7, 2016, 7 pp.
Examination Report from counterpart European Application No. 15187148.0, dated Mar. 21, 2018, 5 pp.
Response to Examination Report dated Mar. 21, 2018, from counterpart European Application No. 15187148.0, filed Jun. 26, 2018, 6 pp.

* cited by examiner

CORROSION AND ABRASION RESISTANT COATING

CROSS REFERENCE TO RELATED APPLICATIONS

This application claims priority to and the benefit of U.S. Provisional Patent Application No. 62/058,274, filed 1 Oct. 2014, the disclosure of which is now expressly incorporated herein by reference.

FIELD OF THE DISCLOSURE

The present disclosure relates generally to gas turbine engines, and more specifically to gearbox coatings.

BACKGROUND

Economic and environmental concerns relating to the reduction of emissions and the increase of efficiency are driving the demand for increasing fuel efficiencies in gas turbine engines. One possible way to increase fuel efficiency may be to reduce the weight of the gas turbine engine through use of more light weight parts. Magnesium components may be a candidate for weight reduction of the gas turbine engine due to magnesium being more lightweight than its counterparts. One possible area for using magnesium or magnesium alloys may include magnesium gearboxes. While magnesium gearboxes may be lightweight they may also be susceptible to corrosion. A coating may be applied to magnesium gearboxes to increase corrosion resistance and prevent damage to the gearbox.

SUMMARY

The present disclosure may comprise one or more of the following features and combinations thereof.

According to an aspect of the present disclosure a gearbox adapted for use with a gas turbine engine is taught. The gearbox comprising a magnesium alloy housing, and an aluminum oxide coating on the magnesium alloy housing to inhibit corrosion and abrasion of the housing, the aluminum oxide coating having a nano-microcrystalline structure, and the aluminum oxide coating may comprise an inner region bonded directly to the housing and an outer region spaced apart from the housing, wherein the outer region may comprise outer porosity, the inner region may have inner porosity, and the inner porosity may have less than the outer porosity. The outer porosity may be between about 30 percent and about 55 percent by volume. The inner porosity may be between about 0.05 percent and about 2 percent by volume. The aluminum oxide coating may have a minimum thickness of about 0.001 inches.

In some embodiments, the aluminum oxide coating may have a thickness of between about 0.001 inches and about 0.004 inches. In some embodiments, the gearbox may further comprise a protective layer bonded to the outer region of the aluminum oxide coating. The protective layer may include a sealer layer bonded directly to the outer region of the aluminum oxide coating, a topcoat of paint, and a primer sandwiched between the sealer and the topcoat of paint. The sealer layer may be selected from a group consisting of an organic polymer matrices in a solvent, resin matrices in epoxy, epoxy-polyamide, polyurethane or a combination thereof.

According to another aspect of the present invention a component for use in a gas turbine engine is taught. The component comprising a magnesium alloy, and an aluminum oxide coating having a nano-microcrystalline structure that may define an inner region which may be bonded to the magnesium alloy and an outer region which may be spaced apart from the magnesium alloy. The outer region may have outer porosity, the inner region may have inner porosity, and the inner porosity may be less than the outer porosity.

In some embodiments, the component may be one of a front frame or an intermediate case adapted to hang a gas turbine engine. In some embodiments, the inner region of the aluminum oxide coating may have a porosity between about 0.05 percent and about 2 percent by volume. The outer region of the aluminum oxide coating may have a porosity of between about 30 percent and about 55 percent by volume. In some embodiments, the aluminum oxide coating may have a minimum thickness of about 0.001 inches. In some embodiments, the aluminum oxide coating may have a thickness of between about 0.001 inches and about 0.004 inches According to another aspect of the present disclosure a method for coating a magnesium component is taught. The method comprising applying an aluminum layer to the magnesium component, oxidizing the aluminum layer to create an aluminum oxide layer, and adding a protective layer to the aluminum oxide layer.

In some embodiments, the protective layer may comprise adding a sealer layer bonded to an outer region of the aluminum oxide layer. In some embodiments, the protective layer may comprise adding a primer layer bonded to a sealer layer. In some embodiments, the protective layer may comprise adding a top coat layer bonded to the primer layer.

In some embodiments oxidizing the aluminum layer to create the aluminum oxide layer may be performed by a process of plasma electrolytic oxidation. In some embodiments, the aluminum oxide layer may be applied to a thickness of between about 0.001 inches and about 0.004 inches, may be formed to include an inner region and an outer region, the inner region may have a porosity between about 0.05 percent and about 2 percent by volume, and the outer region may have a porosity between about 30 percent and about 55 percent by volume.

DETAILED DESCRIPTION OF THE DRAWINGS

Figure 1:
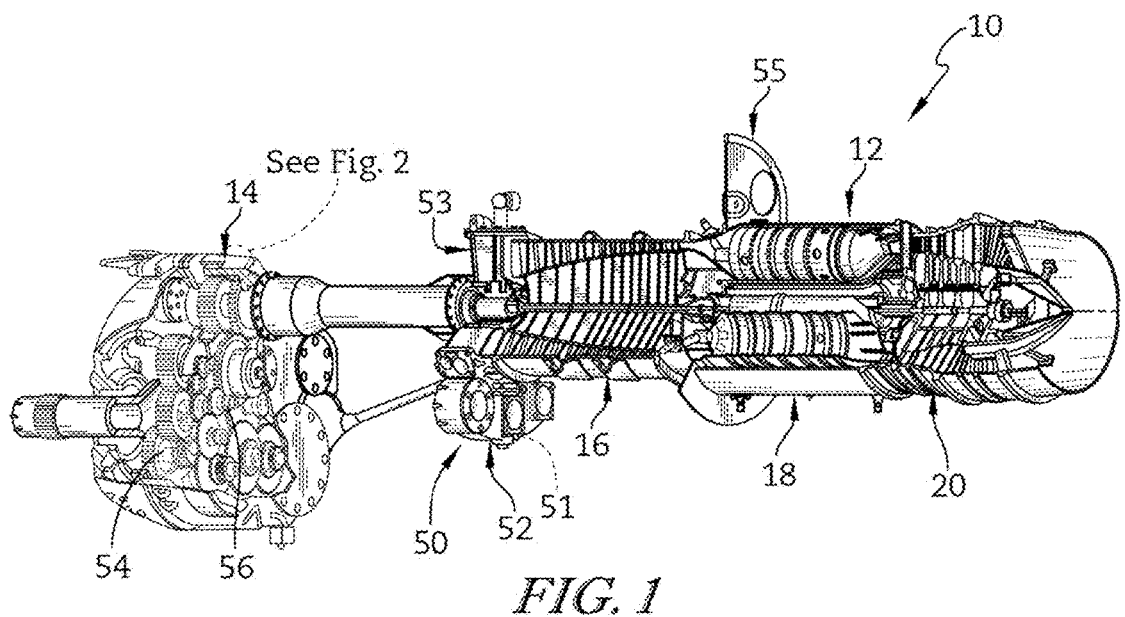
FIG. 1 is a perspective view of a gas turbine engine and the gear box of the gas turbine engine wherein the gearbox includes a protective aluminum oxide coating.

For the purposes of promoting an understanding of the principles of the disclosure, reference will now be made to a number of illustrative embodiments illustrated in the drawings and specific language will be used to describe the same.

An illustrative gas turbine engine 10 may include an engine core 12 and a gearbox 14 driven by the engine core 12 as shown in FIG. 1. The engine core 12 may include a compressor 16, a combustor 18, and a turbine 20. The compressor 16 may deliver compressed air to the combustor 18 where fuel may be mixed with the compressed air received from the compressor 16 igniting the fuel. The hot, high-pressured products from the burning fuel may be directed into the turbine 20 and the turbine may extract work to drive the gearbox 14. The gearbox 14 may provide power to a propeller, generator, or other systems.

Figure 2:
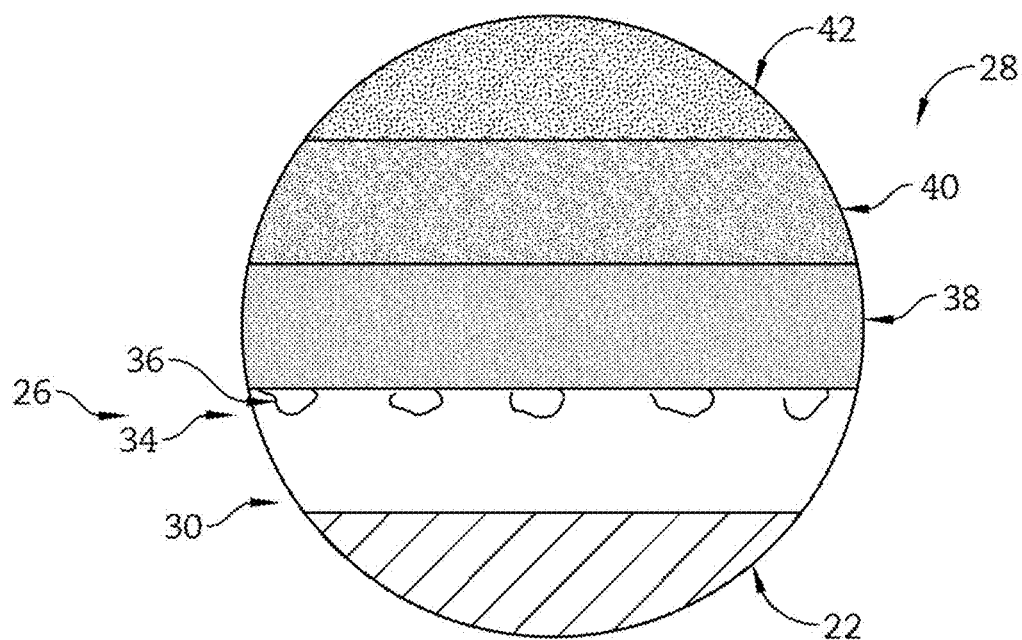
FIG. 2 is a detail view of the aluminum oxide coating from FIG. 1 showing a less porous inner region of an aluminum oxide coating bonded directly to the housing, and a more porous outer region of aluminum oxide coating spaced apart from the housing and bonded to additional protective layers applied to the gearbox.

The gearbox 14 may include a housing 22, an aluminum oxide coating 26 bonded to the housing 22, and a protective paint layer 28 surrounding the aluminum oxide coating 26 as shown in FIG. 2. The housing 22 may be comprised of a magnesium alloy. The aluminum oxide coating 26 may be adapted to reduce corrosion of the housing 22. The protective layer 28 may protect the aluminum oxide coating 26 and the housing from scratches, abrasion, and/or corrosion caused by interaction with the environment around the gearbox 14. The environment around the gearbox 14 may include salt, water, and/or flying solid particles which may interact with the magnesium alloy.

The magnesium alloy used in the housing 22 may be any commercially available magnesium alloy. For example, the composition of the magnesium alloy may comprise between at least 50 weight percent magnesium or at least 90 weight percent magnesium. The magnesium alloy composition may be a mixture of magnesium with other metals such as aluminum, zinc, manganese, silicon, copper, rare earth metals, and zirconium. The magnesium alloy may have a relatively low density when compared to other metals and may be used where a light weight gearbox or structure is helpful such as in aircraft, watercraft, and other weight sensitive applications. Magnesium alloys may be a strong metal which may corrode when exposed to water at room temperature and may react faster when exposed to water at high temperatures such as those achieved in a gas turbine engine environment. Further magnesium alloys may be susceptible to corrosion in the presence of iron, nickel, copper, and cobalt.

A coating such as the aluminum oxide coating 26 may be used to prevent the corrosion and/or abrasion of the magnesium alloy. The aluminum oxide coating 26 may prevent interactions between magnesium and water or between magnesium and other metals such as iron, nickel, copper, and cobalt to decrease the corrosion of the magnesium alloy housing 22. The aluminum oxide coating 26 may prevent reactions between the magnesium alloy housing 22 and the environment the magnesium alloy housing 22 may be exposed to during use of the gas turbine engine 10.

The aluminum oxide coating 26 may have a nano-microcrystalline structure. A nano-microcrystalline structure includes grains sized in both the nanometer size range, less than about 100 nanometers, and in the micrometer size range, greater than about 100 nanometers and less than 1 micron. The aluminum oxide coating 26 in the illustrative embodiment may have a minimum thickness of at least about 0.001 inches and may be ranged between about 0.001 inches and about 0.004 inches. The aluminum oxide coating 26 may be thicker in some applications. The aluminum oxide coating 26 may inhibit oxidation, sulfidation, and other types of corrosion. In addition, the aluminum oxide coating 26 may be wear resistant, abrasive resistant and may provide thermal protection.

Aluminum oxide may have a hardness up to 9 on the Moh Scale, which may allow for a high abrasion resistance and may protect the housing 22 from scratching and corrosion. Materials with similar properties to aluminum oxide may be used, such as materials with a hardness which may be at least 8 on the Moh scale. The Moh scale of mineral hardness characterizes the scratch resistance of various materials by examining the ability of a harder material to scratch a softer material.

In addition, the nano-microcrystalline structure of the aluminum oxide coating 26 may increase the layer plasticity and hardness of the coating 26 enhancing the coating strain compliance. The nano-microcrystalline structure may make it less susceptible to separation from the housing 22. The aluminum oxide coating 26 may be metallurgically bonded to the magnesium alloy of the housing 22.

The nano-microcrystalline structure of the aluminum oxide coating 26 may include an inner region 30 bonded to the housing 22, and an outer region 34 opposite the inner region 30 as shown in FIG. 2. The inner region 30 may be bonded directly to the housing 22. The outer region 34 may be spaced apart from the housing 22 by the inner regions 30 and may form the outer surface of the aluminum oxide coating 26.

The inner region 30 of the nano-microcrystalline structure of the aluminum oxide coating 26 may be sandwiched between the outer region 34 of the aluminum oxide coating 26 and the housing 22 of the gearbox 14 as shown in FIG. 2. The inner region 30 may be denser and/or less porous than the outer region 34. The inner region 30 may have an inner porosity. The inner porosity of the inner region 30 may be between about 0.05 percent and about 2 percent by volume. The porosity may be the measure of the void, or empty spaces of the aluminum oxide coating 26, and may be a fraction of the voids over the total volume. The low porosity of the inner region 30 may prevent further oxidation of the aluminum oxide coating 26. The low porosity of the inner region 30 may provide a more wear resistant, corrosion resistant, abrasion resistant coating for the magnesium alloy housing 22 and may also provide thermal barrier protection due to the hardness and chemical and thermal properties of the aluminum oxide coating 26.

The outer region 34 of the nano-microcrystalline structure of the aluminum oxide coating 26 may include pores 36 and may be more porous and/or less dense than the inner region 30 as shown in FIG. 2. The outer region 34 may comprise outer porosity, wherein the outer porosity may be between about 30 percent and about 55 percent by volume. The porosity may be the measure of the void, or empty spaces of the aluminum oxide coating 26, and may be a fraction of the voids over the total volume. The pores 36 of the outer region 34 of the aluminum oxide coating 26 may be open to the environment and may vary in sizes and shape. The pores 36 may be channels, passages, or openings to environment. A clear line or distinction may not be present between the inner region 30 and the outer region 34, but instead the regions 30, 34 may gradually transition from one to the next.

The protective layer of paint 28 may include a sealer 38, a primer 40, and a top coat 42 each deposited as a layer to protect the aluminum oxide coating 26 as shown in FIG. 2. The sealer 38 may be bonded to the outer region 34 of the aluminum oxide coating 26. The primer 40 may be sandwiched between the sealer 38 and the top coat 42 and may be used to prepare the sealer layer 38 for application of the top coat 42. The top coat 42 may prevent scratches and corrosion of the aluminum oxide coating 26 and the housing 22 below the aluminum oxide coating 26.

The sealer 38 may bond directly to the outer region 34 of the aluminum oxide coating 26 as shown in FIG. 2. The sealer 38 may flow into the open pores 36 of the outer region 34 of the aluminum oxide coating 26. The sealer 38 may bond with the outer region 34 of the aluminum oxide coating 26 along the surface of the outer region 34 and inside the pores 36 forming a tight seal or bond between the sealer 38 and the aluminum oxide coating 26. The sealer 38 may enter the pores 36 and may be deposited along the outer surface of the outer region 34 such that the layer of sealer 38 forms an uninterrupted layer along the outer surface of the outer region 34. The sealer 38 may be selected from a group consisting of various organic polymer matrices in a solvent, resin matrices of epoxy, epoxy-polyamide, polyurethane, and/or any other suitable material for sealing.

In some embodiments, other components included in a gas turbine engine 10 may be made from magnesium alloys and may include aluminum oxide coatings. For example, the magnesium alloy may be a structural frame such as a front frame 53, or an intermediate case 55 for hanging or mounting a gas turbine engine 10 as shown in FIG. 1. The structural frame for use in a gas turbine engine 10 may be comprised of a magnesium alloy and the aluminum oxide coating 26 shown in FIG. 2.

In some embodiments, other gearboxes, structures, or components included in the gas turbine engine 10 may be made from magnesium alloys and may include aluminum oxide coatings. Anywhere a magnesium alloy component may be used in a gas turbine engine 10 may require protection for the magnesium alloy component due to the low hardness level and low corrosion or abrasion resistance of magnesium. For example, an accessory gearbox 50 of the gas turbine engine 10 may include a magnesium housing 22 and may have an aluminum oxide coating 26 as shown in FIGS. 1 and 2. The gearbox 50 may use gears 51, 52 forming gear trains 54, 56 to provide speed and torque conversion between the engine core 12 and another device as shown in FIG. 1. The accessory gearbox 50 may provide power to engine driven accessories and air systems for aircraft pressurization, engine starting, and cross bleed starts. Using magnesium alloys for the accessory gearbox 50 may decrease the overall weight of the gas turbine engine 10 increasing efficiencies of the gas turbine engine 10 and coating the magnesium alloy may provide the necessary protection to the magnesium alloy.

Figure 3:
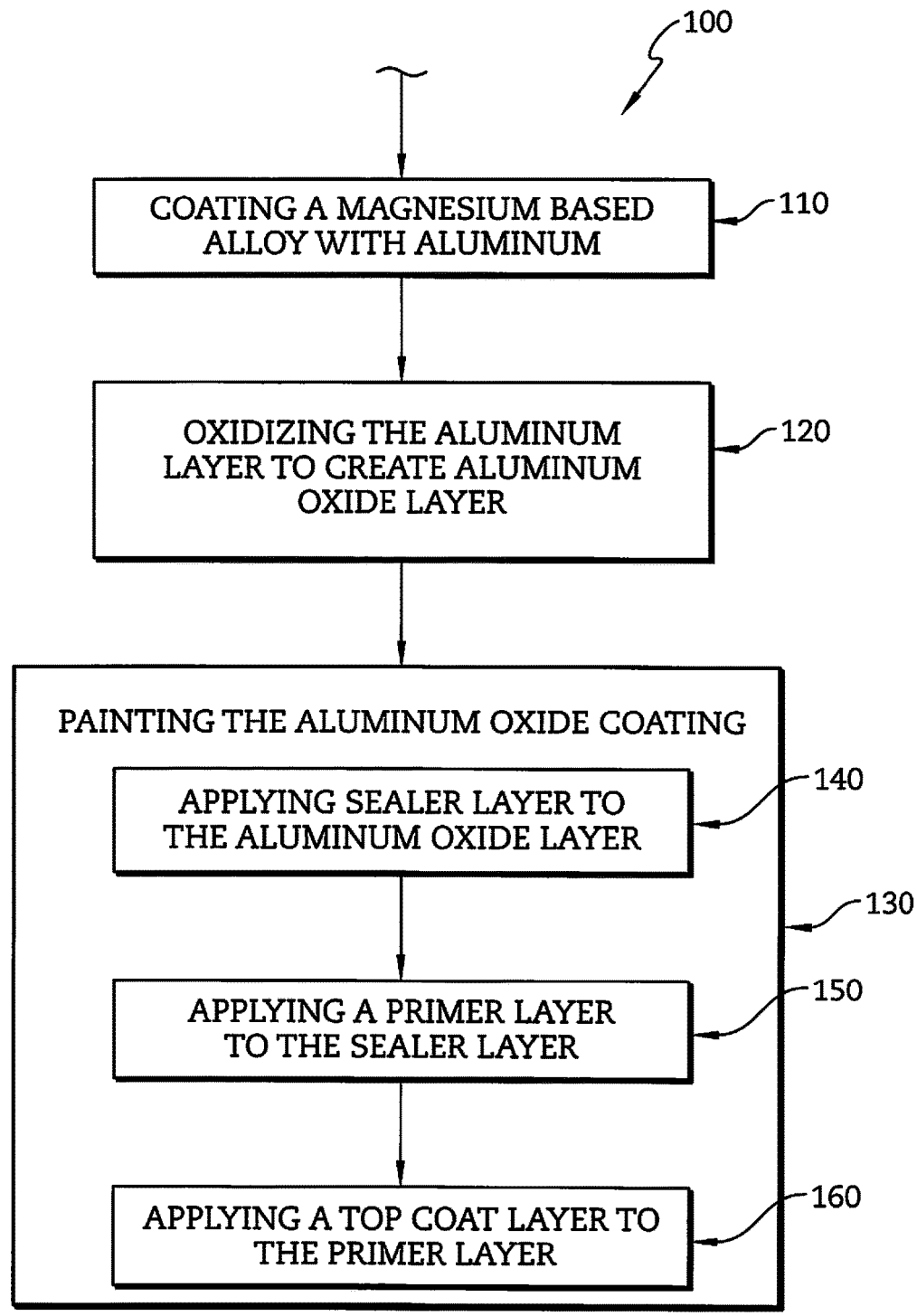
FIG. 3 is a block diagram depicting a method of coating a magnesium gearbox for use in a gas turbine engine.

One illustrative method for coating a magnesium alloy component 100 is provided in FIG. 3. In a step 110 of the method 100, an aluminum oxide coating 26 may be applied to a magnesium alloy component. Illustratively the magnesium alloy component may be a housing such as the housing 22 of the gearbox 14 shown in FIGS. 1 and 2. In some embodiments, the magnesium alloy component may be a structural component 53, 55 for hanging or mounting a gas turbine engine as shown in FIG. 1. The coating may be applied using thermal spray techniques such as plasma spraying, cold spraying, chemical vapor deposition, electroplating, physical vapor deposition, and/or any other suitable method for applying a coating.

Thermal spraying techniques such as cold spraying may involve accelerating the particles to high speeds by the carrier gas forced through a converging-diverging nozzle. Upon impact, particles with sufficient kinetic energy may deform plastically and metallurgically bond to a substrate such as the housing 22 of the gearbox 14 shown in FIGS. 1 and 2. A velocity to form the bond may depend on the properties of the material to be sprayed. The process of spraying the housing 22 to coat the housing 22 may be performed at least one time, but may be performed any number of times to achieve the thickness required to provide protection to the magnesium alloy component illustratively shown as the housing 22 of the gearbox 14 shown in FIGS. 1 and 2. The aluminum may be applied to produce an aluminum oxide layer 26 which may have a final thickness of between about 0.001 inches and about 0.004 inches and may include an inner region 30 and an outer region 34. The inner region 30 may have a porosity between about 0.05 percent and about 2 percent by volume and may be less porous than the outer region 34.

In a step 120 of the method 100, the coating may be oxidized to produce an oxide layer as described in FIG. 3. The oxidized layer may be an aluminum oxide layer such as the aluminum oxide layer 26 of FIGS. 1 and 2. Oxidizing aluminum may provide a coating with high hardness and a continuous barrier to protect the magnesium housing 22 from wear, corrosion and heat generated within the gearbox 14. The passivating oxide layer formed by aluminum may also regrow if scratched off.

Illustratively oxidation of the aluminum may occur through a plasma electrolytic oxidation process or microarc oxidation. Plasma electrolytic oxidation may be an electrochemical surface treatment capable of generating oxide coatings on a metal. Plasma electrolytic oxidation of the aluminum oxide coating 26 may be a conversion coating in which the aluminum layer deposited in step 110 of the method 100 may be chemically converted into aluminum oxide. A conversion coating may have stronger adhesion properties when compared to a deposited coating.

Plasma electrolytic oxidation may include immersing the component in a bath of electrolytes. The time of immersing the component in a bath of electrolytes may vary. The electrolytic bath may be used as one of the electrodes of the electrochemical cell and may be paired with the wall of the bath which may act as a counter electrode. Electrical potentials may be applied through continuous or pulsed direct current or alternating pulses to fully oxidize the coating. The parameters of electrical potential, electrolytic bath components and time of immersion in the electrolyte may be varied to increase coating thickness, increase porosity, and change pore size etc. to create a nano-microcrystalline structure.

In a step 130 of the method 100, a protective painting layer may be applied to the aluminum oxide coating 26 as described in FIG. 3. The painting layer may illustratively be the protective paint layer 28 shown in FIG. 2 and may include a sealer 38, a primer 40 and a top coat 42 shown in FIG. 2 and described in FIG. 3. The paint layer 28 may be applied by to the component such as the housing 22 of the gearbox 14 by techniques such as brushing, spraying, dipping, or rolling. Following the application of the paint layer 28, drying of the paint layer 28 may occur by heating the component in a stove or the paint layer 28 may be air dried. Each layer of the protective paint layer 28 may be applied separately and may not be applied using the same techniques as each of the other layers to be applied to the housing 22.

In a step 140 of the method 100, a sealer, such as sealer 38 shown in FIG. 2 may be applied to the aluminum oxide coating as described in FIG. 3. The sealer 38 may function to bind the primer 40 and the top coat 42. The sealer 38 may be applied such that the sealer 38 flows into the porous open pores 36 or channels of the aluminum oxide layer 26. The sealer 38 may fill the porous open pores 36 forming a tight seal and bond between the sealer 38 and the aluminum oxide layer 26. The sealer 38 may be sandwiched between the aluminum oxide layer 26 and the primer 40. The sealer 38 may be applied as a single layer or may require multiple applications to produce a sealer 38 of the appropriate thickness to protect the aluminum oxide layer 26 and the housing 22. The sealer 38 may be applied by any suitable method such as brushing, spraying, dipping, or rolling the sealer onto the magnesium component.

In a step 150 of the method 100, a primer may be applied to the sealer 38 as described in FIG. 3. The primer layer may illustratively include the primer 40 of FIG. 2. The primer 40 may be sandwiched between the sealer 38 and the primer 40. The primer 40 may be applied through brushing, spraying, dipping, rolling or any other suitable method for applying a primer 40 to the housing 22 of the gearbox 14. The primer 40 may bond directly to the sealer 38 and may be included to assist with bonding additional layers. Additional layers of primer 40 may be applied and may provide further corrosion and oxidation protection to the housing 22 of the gearbox 14 shown in FIG. 2. The primer 40 may be applied in one application or may require multiple applications to achieve the thickness of primer 40 necessary to bond additional protective paint layers 28.

In a step 160 of the method 100 a top coat may be applied to the primer 40 as described in FIG. 3. The top coat layer may illustratively include the top coat 42 of FIG. 2 and may include paint or any other suitable material. The top coat 42 may be applied in a single application or may require multiple applications to achieve the necessary protection. The paint may be of any color and may applied through brushing, spraying, dipping, or rolling of the top coat 42. The top coat may be applied to reduce scratching and corrosion of the protected component.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A component for a gas turbine engine, the component comprising:
    a magnesium alloy; and
    an aluminum oxide coating having a nano-microcrystalline structure that defines an inner region bonded to the magnesium alloy and an outer region spaced apart from the magnesium alloy,
    wherein the outer region is porous and has an outer porosity, the inner region is porous and has an inner porosity, and the inner porosity is less than the outer porosity.

2. The component of claim 1, wherein the component is one of a front frame or an intermediate case of a gas turbine engine.

3. The component of claim 1, wherein the inner region of the aluminum oxide coating has a porosity between about 0.05 percent and about 2 percent by volume.

4. The component of claim 3, wherein the outer region of the aluminum oxide coating has a porosity of between about 30 percent and about 55 percent by volume.

5. The component of claim 1, wherein the aluminum oxide coating has a minimum thickness of about 0.001 inches.

6. The component of claim 3, wherein the aluminum oxide coating has a thickness of between about 0.001 inches and about 0.004 inches.

7. A method for coating a magnesium component, the method comprising:
    applying an aluminum layer to a magnesium alloy of the magnesium component;
    oxidizing the aluminum layer to create an aluminum oxide coating having a nano-microcrystalline structure that defines an inner region bonded to the magnesium alloy and an outer region spaced apart from the magnesium alloy, wherein the outer region is porous and has an outer porosity, the inner region is porous and has an inner porosity, and the inner porosity is less than the outer porosity; and
    adding a protective layer to the aluminum oxide coating.

8. The method of claim 7, wherein the adding the protective layer comprises adding a sealer layer bonded to the outer region of the aluminum oxide coating.

9. The method of claim 8, wherein the adding the protective layer comprises adding a primer layer bonded to the sealer layer.

10. The method of claim 9, wherein the adding the protective layer comprises adding a top coat layer bonded to the primer layer.

11. The method of claim 9, wherein the oxidizing the aluminum layer to create the aluminum oxide coating is performed by a process of plasma electrolytic oxidation.

12. The method of claim 9, wherein the aluminum oxide coating is applied to a thickness of between about 0.001 inches and about 0.004 inches, the inner region has a porosity between about 0.05 percent and about 2 percent by volume, and the outer region has a porosity between about 30 percent and about 55 percent by volume.

13. The component of claim 1, wherein the component is a gearbox, and wherein the gearbox comprises a housing comprising the magnesium alloy.

14. The component of claim 13, wherein the outer porosity is between about 30 percent and about 55 percent by volume.

15. The component of claim 13, wherein the inner porosity is between about 0.05 percent and about 2 percent by volume.

16. The component of claim 1, wherein the aluminum oxide coating has a maximum thickness of about 0.004 inches.

17. The component of claim 16, wherein the aluminum oxide coating has a thickness of between about 0.001 inches and about 0.004 inches.

18. The component of claim 1, further comprising a protective layer bonded to the outer region of the aluminum oxide coating.

19. The component of claim 18, wherein the protective layer includes a sealer layer bonded directly to the outer region of the aluminum oxide coating, a topcoat of paint, and a primer sandwiched between the sealer and the topcoat of paint.

* * * * *